Jan. 27, 1953

H. S. GLEASON

2,627,056

CONTROL DEVICE

Filed Feb. 29, 1952

*INVENTOR.*
HOWARD S. GLEASON

BY *T. L. Bowes*

ATTORNEY

Jan. 27, 1953     H. S. GLEASON     2,627,056
CONTROL DEVICE Filed Feb. 29, 1952     3 Sheets-Sheet 2

*INVENTOR.*
HOWARD S. GLEASON
BY
*J. L. Bowes*
ATTORNEY

Jan. 27, 1953 H. S. GLEASON 2,627,056
CONTROL DEVICE
Filed Feb. 29, 1952 3 Sheets-Sheet 3

*INVENTOR.*
HOWARD S. GLEASON

BY *J. L. Bower*

ATTORNEY

Patented Jan. 27, 1953

2,627,056

UNITED STATES PATENT OFFICE 2,627,056

CONTROL DEVICE

Howard S. Gleason, Rochester, N. Y., assignor to Stromberg-Carlson Company, a corporation of New York Application February 29, 1952, Serial No. 274,243

19 Claims. (Cl. 318—27)

My invention relates to control devices, and more particularly to multi-function control devices.

My invention is especially applicable to remote control devices, but is not limited thereto. In general, my invention may be said to belong to the class of control devices in which one or more electric motors are arranged to drive any one of a number of output shafts at a time, the shaft to be driven being selected by electrical controls at a convenient point. Such devices are useful where mechanical linkages from the control point to the mechanism are either undesirable or impractical. Obviously, devices of this class can be employed where remotely-located electrical potentiometers are used to control electric apparatus; in such cases, the electrical potentiometers performing the direct control function are located near or on the apparatus to be controlled, and are arranged to be adjusted through the medium of one or more electric motors. These motors may be controlled from the remote position by means of push buttons or other switching means connected by means of wires or cables for example, to the motors and to a source of motor power.

One application for multi-function controls is in the operation of a television receiver. Here it is usually desirable that the viewer be able to adjust the contrast, audio volume, channel selecting and fine tuning controls. Moreover, it is desirable that the viewer be able to make these adjustments (from viewing position) without having to move to the receiver to manipulate the controls just enumerated.

Control devices adapted to perform multiple functions which have been known prior to my invention have either been of the type in which the switches and potentiometer themselves are located remotely, or have been, as far as I am aware, of the types requiring an electric motor for each function to be performed. The first of these types is objectionable because excessive capacitance, and therefore degraded performance, is usually associated with cables of useful length. Moreover, it has been common to provide a control station at the television receiver itself, thus duplicating the controls present at the control head situated at the remote control location. The main objection to the second type is its excessive cost. The complications introduced by either type of control device hitherto known result in a certain degree of unreliability in operation. Another frequent objection to the use of a multi-function control device with a television receiver has been the excessive number of wires required in the cable connecting the control head with the television receiver.

It is accordingly an object of my invention to provide a multi-function control device of a new and useful type.

It is another object of my invention to provide a multi-function control device in which a single electric motor is arranged to drive any one of a plurality of output shafts at a time.

It is another object of my invention to provide a multi-function control device in which any one of a plurality of output shafts may be driven at a time, depending on the position of a function-selecting switch at the control head.

It is still another object of my invention to provide a multi-function control device which is simple in construction and low in cost, but which is also reliable in operation.

It is a further object of my invention to provide a multi-function control device in which a minimum number of conductors is employed in the cable between the control head and the point of application of the control functions.

It is yet another object of my invention to provide a control device for a television receiver in which the control head therefor can be placed either in the television receiver or at a location remote therefrom to prevent duplication of the function controls.

It is another object of my invention to provide a means for controlling the usually desired adjustments of a television receiver from a control head which may be located either at the receiver or at a remote location, together with means for keeping unused portions of the interconnecting cable out of sight and out of the way inside the cabinet.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which.

Figure 1:
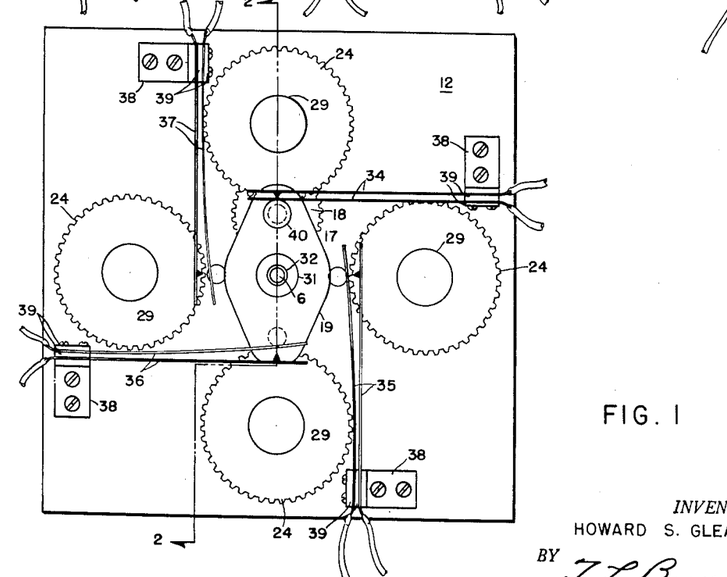
Fig. 1 is a front view of one embodiment of my invention.
Figure 2:
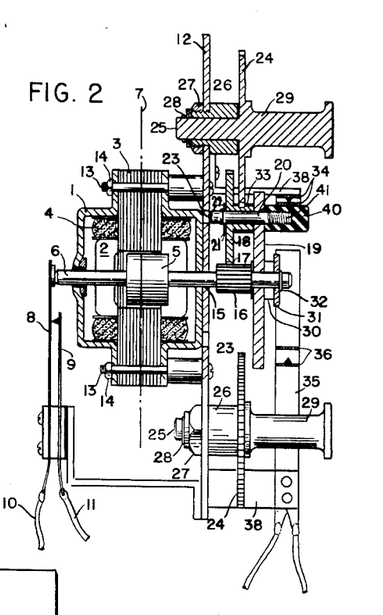
Fig. 2 is a cross-section of an elevational view along line 2—2 of the embodiment shown in Fig. 1 with no power applied to the motor.

Referring now to the drawings, Figs. 1 and 2 illustrate the preferred disposition of the mechanical portions of one embodiment of my invention. Visible in Fig. 2 is electric motor 1 with its field structure 2 comprising core 3 and field winding 4. The armature 5 of motor 1 is mounted on a shaft 6. The magnetic center of the field structure is represented by center line 7. Armature 5 is displaced from center line 7 when no voltage is applied, due to the action of resilient biasing means, or spring, 8. I have chosen to show spring 8 as performing the additional duty of a contact spring which makes a circuit with mating spring 9. Springs 8 and 9 are connected through leads 10 and 11 to a circuit whose purpose will be made clear in connection with the discussion of Fig. 4 below. At this time, however, it is sufficient to point out that while I have shown the armature-biasing means combined with the circuit-making means, these functions might obviously be performed by a spring separate from the contacts without departing from the spirit and scope of my invention.

As shown in Fig. 2, motor 1 may be secured to a mounting member, or plate, 12 by means of screws 13 and nuts 14, although any convenient fastening method may be employed. Shaft 6 extends through a hole 15 in mounting member 12 so that a driving member, or sun gear, 16 may be mounted thereon. Continuously engaged with sun gear 16 is a toothed portion 17 of an intermediate, or planetary gear member 18. Planetary gear member 18 is supported on a position member, or carrier, 19 which, in turn, is mounted for rotation coaxially with (but independently of) shaft 6. Planetary gear member 18 is secured to carrier 19 by means of a stub axle 20, planetary gear member 18 being secured thereto, as by means of C-washer 21.

It will be observed that axial motion of armature 5 into the magnetic center line 7 of the field structure of motor 1 is effective to move carrier 19 in an axial direction also. Therefore, planetary gear member 18 is moved in the same linear direction, provided the end 22 of axle 20 is opposite a recess 23 provided in mounting member 12. I provide a plurality of recesses 23 in mounting member 12, each of these recesses being located and dimensioned such that end 22 of stub axle 20 can mate therewith. When end 22 is not opposite one of the holes 23 in mounting member 12, the end 22 butts against mounting member 12 and therefore prevents axial movement of the assembly comprising planetary member 18, stub axle 20, carrier 19, shaft 6 and armature 5. It can therefore be seen that mounting member 12 performs the function of a stop member, and that end 22 of stub axle 20 is a detent means. The recesses 23 in the stop member thus form a portion of the detent arrangement.

Further in accordance with my invention, I provide one or more of driven members, or "function" gears, 24. As can be seen more clearly from Fig. 1, I have chosen to illustrate my invention as applied to a multi-function control device which performs four functions, these four functions being especially adaptable to the control of contrast, audio volume, channel selection, and fine tuning of a television receiver. These function gears are mounted for rotation independent of each other on their own stub axle portions 25. The latter are preferably secured in journals 26 affixed to mounting member 12 by means of nuts 27. Each stub axle portion 25 is retained in its individual journal 26 by means of a C-washer 28 or other convenient means. Each of the function gears is illustrated as being integrally formed with a capstan portion 29.

Carrier 19 is retained on shaft 6 by C-washer 32 which adjoins washers 30 and 31. However, carrier 19 is consequently free to rotate independently of shaft 6, but moves axially therewith. I prefer this construction, but carrier 19 could obviously be mounted on a separate axle for rotation coaxial with, but independent of, shaft 6.

It will be observed that each of function gears 24 is located radially outwardly from shaft 6 at a distance which allows toothed portion 33 of planetary gear member 18 to mesh with one of the function gears 24 at a time. Through rotation of carrier 19 around shaft 6, toothed portion 33 can be brought into mesh with any of the function gears 24 desired.

It will be further observed that rotation of the carrier 19 about shaft 6 is possible only when the detent end 22 of stub axle 20 is not opposite one of the holes 23. If power is applied to motor 1, carrier 19 is rotated about shaft 6 (mainly because of the reaction of planetary gear member 18 against sun gear 16 but also because of the frictional drive provided by washers 30 and 31) as long as detent end 22 of stub axle 20 butts against the front surface of the stop member, or mounting member, 12. However, when motor 1 is energized in order to perform this rotational function, armature 5 tends to pull toward the magnetic center 7 of motor 1 against the force of resilient biasing means 8. Therefore, whenever detent end 22 of stub axle 20 is opposite one of holes 23, detent end 22 will drop into that hole and rotation of carrier 19 will cease.

Figure 3:
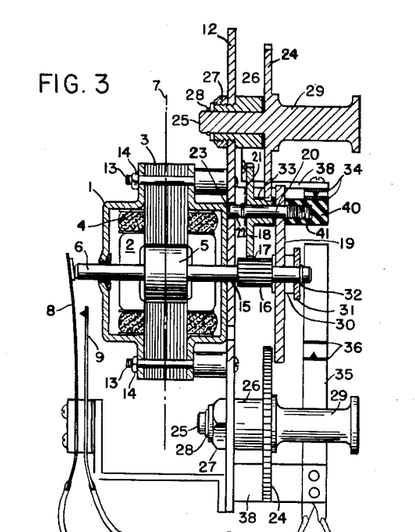
Fig. 3 is a sectional view along line 2—2 like that of Fig. 2, but with power applied to the motor.

According to my invention, I dispose recesses 23 such that rotation of carrier 19 ceases when detent end 22 drops into a recess 23 at the point where a corresponding one of function gears 24 is fully engaged with toothed portion 33 of planetary gear member 18. The particular function gear engaged is driven, as long as power continues to be applied to motor 1, through the medium of planetary gear member 18 and sun gear 16. Fig. 3 shows that in this situation, armature 5 has been pulled to the magnetic center of motor 1 because end 22 has arrived opposite a hole 23 and has mated therewith. At this time, however, it will be observed from Fig. 3 that the first circuit made through contact springs 8 and 9 has been broken.

The embodiment of my invention illustrated in Figs. 1–3 also includes sets 34, 35, 36 and 37 of normally-open contact springs. These springs may be supported from mounting member 12 by means of brackets 38, which are provided with insulating means 39. A contact-closing member 40 is mounted on carrier 19, and, in the embodiment illustrated, acts as a nut for the threaded portion 41 of stub axle 20 to secure this stub axle and planetary gear member 18 on carrier 19. Member 40 is preferably constructed of insulating material. From the positions of contact-spring sets 34—37 shown in Fig. 1, it can be seen that one of these sets or normally-open contacts is closed by contact closing member 40 whenever detent end 22 drops into one of the recesses 23.

Figure 4:
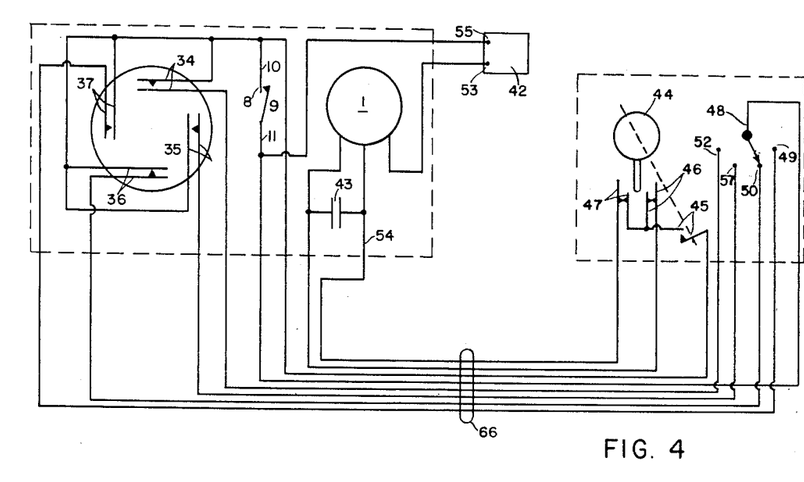
Fig. 4 is a schematic wiring diagram employed to control the apparatus of Fig. 1.

The control circuit for the mechanical apparatus shown in Figs. 1-3 is diagrammed in Fig. 4. Contact sets 34—37 are here indicated schematically, as is electric motor 1. Power for electric motor 1 is derived from power source 42. I have indicated power sources 42 in block form because those skilled in the electrical art will readily understand that any conventional source of power, such as a central energy station, or conventional wall outlet, etc., may be employed as a power source for the motor. I have illustrated motor 1 as being a shaded pole reversible type, and hence power source 42 must be of the alternating-current type. A capacitor 43 may be employed when the shaded pole type of motor is used in order to produce a current in one field winding displaced 90° from that in the other winding.

The control head for a multi-function control device constructed according to my invention may comprise only two switches. The first of these, a directional switch 44, may be combined with means for turning power source 42 on and off. Thus switch 44 may have a center "stop" position, as shown in Fig. 4, with a "forward" position to one side of center and a "reverse" position to the other side of center. To accomplish this type of operation, switch 44 may be arranged to close contacts 45 whenever the switch control knob is depressed, or moved downward. Furthermore, switch 44 may be arranged to open either one or two sets of contacts, 46 and 47, depending upon the direction in which the switch control knob is turned. I prefer to employ the type of switch schematically indicated because the contact springs can be made to act as springs to return the switch knob or lever to its center off position, but those skilled in the art will readily see that other types of direction switches may be employed.

The second switch in the control head may be a function-selecting switch 48 which may have positions 49, 50, 51 and 52 corresponding respectively to the four positions which may be assumed, in the embodiment here being described, by carrier 19.

In operation, the function-selecting switch is set in the particular position corresponding to the particular function it is desired to control. After selecting the function to be controlled, the direction switch 44 may be depressed and actuated from its center "stop" position to the position corresponding to the direction it is desired to have motor 1 rotate. In the case of a television receiver, for example, it might be desired to increase the audio volume. In this event, function-selecting switch 48 is set on the position corresponding to the audio volume control function. Next, direction switch 44 is depressed and turned in the "increase" direction.

When contacts 45 are closed by depression of the knob of switch 44, the windings of motor 1 are energized. This causes armature 5 to pull to the magnetic center of the field structure of the motor. If the direction switch knob is merely depressed without being turned, shaft 6 breaks the first energizing circuit for the motor at contacts 8 and 9. The armature cannot turn under these circumstances because capacitor 43 is short-circuited by contacts 46 and 47, and there can consequently be no 90° phase difference in the motor field winding currents, as is required to produce a torque. Breaking the circuit causes the magnetic field to collapse and therefore allows shaft 6 to return to its original position. But this remakes the original circuit and causes the foregoing action to repeat until the direction switch knob is either turned or released.

In normal usage, the knob is turned simultaneously with depression or else a fraction of a second later. As soon as this is done, either contacts 46 or 47 (depending upon the direction of motor rotation required) are opened. This removes the short circuit from capacitor 43 and armature consequently rotates whenever contacts 8 and 9 are closed. Carrier 19 consequently is rotated until planetary gear member 18 meshes with the particular function gear to perform the desired function. The capstan of the proper function gear may be linked, as by means of a flexible cable or belt, to the shaft of the audio volume control of the television receiver, in order to rotate the shaft.

Assume, for example, that function switch 48 is set on contact 50, and that contact 50 corresponds to the audio control function. Assume further that carrier 19 is positioned such that contacts 34 are closed, and that when the user of the control device moves the directional control switch to the "increase" position, contacts 46 are opened. Power is thus applied from terminal 53 of power supply 42, through the winding of motor 1, lead 54, contacts 47, power switch contacts 45, contacts 8 and 9, to terminal 55 of power source 42. Motor 1 now rotates and consequently moves carrier 19, because of the reaction of planetary gear member 18 against sun gear 16 (see Fig. 2), enough to prevent detent end 22 from mating with the particular hole 23 opposite which it had just been situated. Since detent end 22 then butts against stop member 12, armature 5 cannot pull over to the magnetic center 7 of field structure 2.

When carrier 19 has been rotated 90°, detent end 22 is positioned opposite another recess 23. Then, due to the magnetic force of field structure 2 acting on armature 5, detent end 22 drops into that particular recess 23. As soon as this occurs, armature 5 is able to move toward center line 7, thus moving contact spring 8 away from spring 9 and so breaking the first circuit to the motor.

Since its first circuit is broken at contacts 8 and 9, motor 1 stops. This allows armature 5 to move axially away from center line 7 under the biasing influence of contact spring 8, thereupon remaking the first circuit traced above. Carrier 19 is consequently rotated as explained previously.

When carrier 19 has rotated another 90°, detent end 22 of stub axle 20 is again opposite one of recesses 23. Under the influence of the magnetic force of field structure 2, armature 5 moves axially as detent end 22 drops into the recess. As before, the first circuit to motor 1 is broken as contact 8 moves away from contact 9. However, in this case a second circuit is made as follows: terminal 53 of power source 42, winding of motor 1, conductor 54, contacts 47, power switch contacts 45, contacts 36 (closed as the result of contact closing-member 40 arriving directly opposite them), contact 50, and switch 48 to terminal 55 of power source 42. Since a second circuit is now made to motor 1, the motor continues to rotate and to drive, through the medium of planetary gear member 18, the particular function gear corresponding to contact 50, and therefore to the audio control function. This action continues until the operator releases the knob directional switch 44, thus breaking the power circuit at contacts 45.

It can be appreciated that the operator may reverse the direction of motor rotation at will by turning the knob of switch 44 in the opposite direction. This does not cause carrier 19 to rotate, if the operator has not yet released the direction switch knob; but if release of the knob has occurred, carrier 19 is rotated through 360° (this time in the opposite direction) until the same function gear is engaged. It can be seen that the non-release type of operation is advantageous in that rapid and easy adjustment of such controls as the fine tuning of a television receiver is greatly facilitated.

From the foregoing explanation, it will be seen that any one of the function gears can be rotated at will in either direction depending upon the setting of function-selecting switch 48 and the actuation of direction switch 44.

Figure 5:
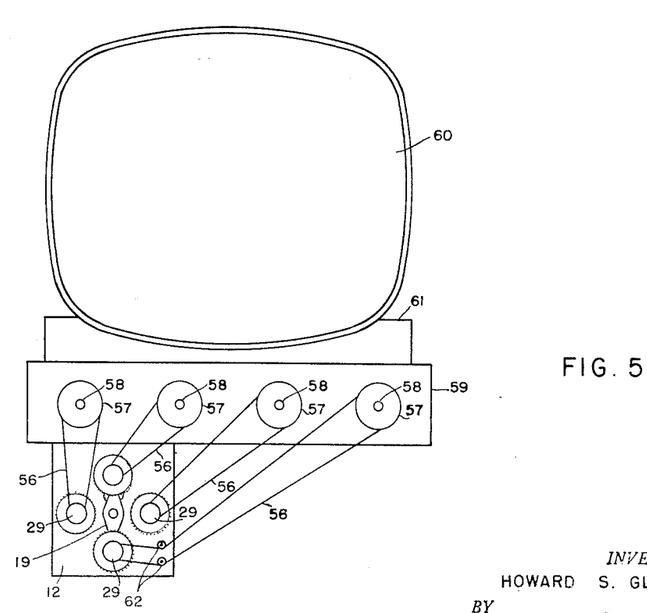
Fig. 5 shows how the embodiment of Fig. 1 may be mounted on a television receiver chassis to control, one at a time, the positions of the various receiver controls.

One method of applying this embodiment of my invention to the control of the contrast, audio volume, channel selecting and fine tuning function of a television receiver is illustrated in Fig. 5. Here each of the capstans 29 is connected by means of a flexible belt or cable 56 to a drum 57 secured to the control shaft 58 of a corresponding one of the controls on the front of television receiver chassis 59. The picture tube of the television receiver is indicated at 60 and its support at 61.

The mechanical portion of this embodiment of my invention is illustrated as being attached to the receiver chassis in an acceptable location, although it will be understood that it may be mounted in any convenient location. Pulleys, such as idlers 62, may be employed to route a particular cable to the proper control drum. The mechanical portion of this embodiment, that is, the portion mounted on member 12, may be attached to chassis 59 by any suitable means, such as by welding. It will be obvious, however, that many alternative mountings might be devised without departing from the spirit of my invention. In fact, mounting member 12 might be mounted on the television receiver cabinet and not on the chassis at all.

Figures 6, 7:
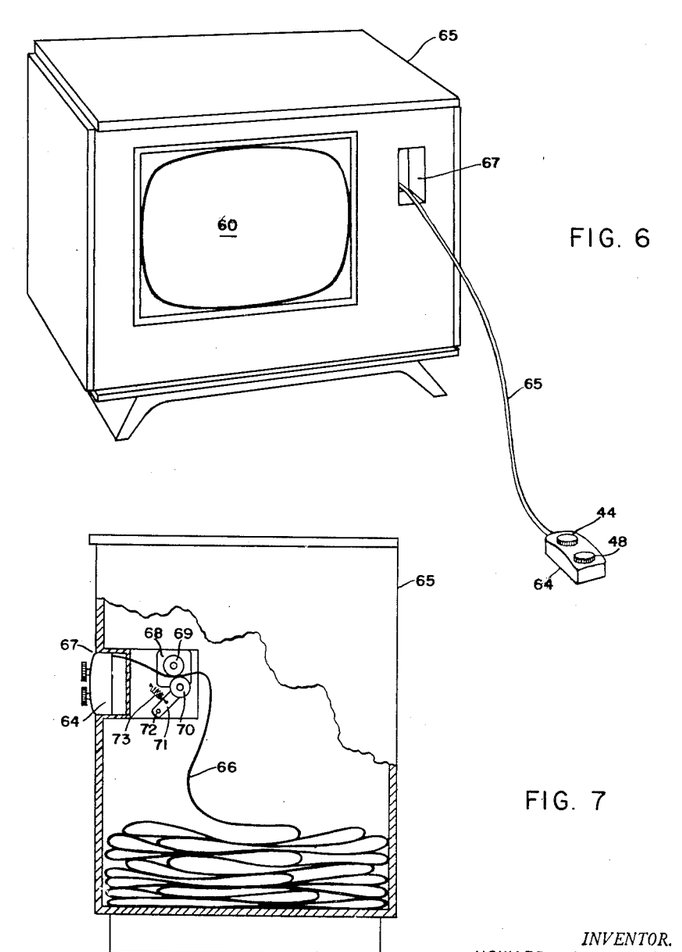
Fig. 6 shows how the control head may be located remotely from a television receiver.
Fig. 7 is a partially broken-away view of the receiver shown in Fig. 6, in which it is illustrated that the control head may be affixed to the cabinet, with the surplus wire disposed within the cabinet.

Fig. 6 illustrates how controls 44 and 48 may be mounted in a housing 64 to form a remote control for a television receiver chassis housed in a cabinet 65. A cable connecting the remote control head 64 to receiver 65 is indicated at 66. The cable is also indicated schematically by reference symbol 66 in Fig. 4.

The partially broken-away view of cabinet 65 shown in Fig. 7 demonstrates how remote control housing 64 may be positioned in a mating recess 67 in order to avoid duplication of switches 44 and 48 at the receiver. When used in this fashion, the entire length of cable 66 may be disposed in the bottom interior of cabinet 65 as shown in Fig. 7.

To assist in reeling in cable 66, I may prefer to provide a motor 68 of either the electrical or spring-wound type. Motor 68 is preferably equipped with a rubber-tired pulley 69. An idler pulley 70 is mounted on an arm 71 pivoted about axis 72, the cable 66 being disposed between pulleys 69 and 70. A spring 73 acting on arm 71 insures that cable 66 will be held in place between the pulleys at all times and especially while the latter are in motion. If a spring wound motor is used, it may be arranged to be wound by the action of pulling out cable 66 when remote control head 64 is taken to a location in the room other than where the receiver is situated. Motor 68 can then be arranged to be unlatched by a slight pull on the cord, in the fashion of a roller window shade, to reel in cable 66. A ratchet mechanism well-known in the field of cord reels may be employed.

Unused portions of cable 66 are kept within the cabinet and out of the way by the foregoing arrangement. When an electric motor is used, a ratchet-actuated switch may be employed for motor 68, or switches may be located in any convenient place, such as on the receiver itself or on the remote control head itself. In the latter case, of course, additional wires are required in cable 66.

Those skilled in the art to which my invention appertains will readily comprehend that more or fewer than the four function gears may be disposed for engagement with planetary gear member 18. It is a feature of my invention that for the control of $n$ function gears, only $n+4$ conductors are required in the cable interconnecting the control head and the remainder of the apparatus.

While I have shown and described my invention as applied to a specific embodiment thereof, other modifications will readily occur to those skilled in the art. Friction drive members, such as rubber-tired wheels, for example, may be used in place of sun gear 16, planetary gear member 18 or function gears 24. I do not, therefore, desire my invention to be limited to the specific arrangement shown and described, and I intend in the appended claims to cover all modifications within the spirit and scope of my invention.

What I claim is:

1. In a multi-function control device, the combination of a plurality of output shafts; an electric motor operable to drive any one of said output shafts in either direction; a source of power for said motor; a control circuit for said motor; a remotely disposed motor directional control switch and a remotely disposed output shaft selecting switch; said control circuit being arranged to connect said motor to said source of power and to cause said motor to rotate any one of said output shafts in either direction, the particular output shaft and the direction of its rotation being dependent upon the setting of said motor directional switch and said output shaft selecting switch.

2. In a multi-function control device, the combination of $n$ output shafts; an electric motor operable to drive any one of said output shafts in either direction; a source of power for said motor; a control circuit for said motor; remote control means containing a motor directional control switch and an output shaft selecting switch; said control circuit being arranged to connect said motor to said source of power and to cause said motor to rotate any one of said output shafts in either direction, the particular output shaft and the direction of its rotation being dependent upon the setting of said motor directional switch and said output shaft selecting switch in said remote control head, said remote control head being connected to said motor and said source of power by a cable containing $n+4$ conductors.

3. In a multi-function control device, the combination of a driving member; an intermediate member continuously engaging said driving member; a plurality of driven members rotatable independently of one another, said driven members being located such that each may be singly engaged by said intermediate member; means for maintaining said intermediate member in engagement with any given one of said driven members; means for releasing said maintaining means, and means responsive to the release of said maintaining means for moving said intermediate member out of engagement with said any one of said driven members and into engagement with another one of said driven members.

4. In a multi-function control device, the combination of a sun gear; driving means for said sun gear; a planetary gear member continuously engaging said sun gear; a carrier for said planetary gear member mounted for coaxial rotation with respect to said sun gear; a mounting member; a plurality of function gears mounted on said mounting member for rotation independently of one another, said function gears being located relative to said sun gear such that each may be singly engaged by said planetary gear member; detent means adapted to maintain said planetary gear member in engagement with any given one of said function gears; and means for releasing said detent means, whereby upon release of said detent means said carrier is rotated through the reaction of said planetary gear member against said sun gear, out of engagement with any particular one of said function gears and into engagement with another one of said function gears.

5. In a multi-function control device, the combination of a driving member; an intermediate member continuously engaging said driving member; a plurality of driven members rotatable independently of one another, said driven members being located such that each may be singly engaged by said intermediate member; detent means mounted with said intermediate member; resilient means for biasing said detent means toward the disengaged position thereof; a stop member; a plurality of recesses located to receive said detent means when said intermediate member is in full engagement with a corresponding one of said driven members; and means for optionally overcoming the force of said resilient means, said last-named means being operative to move said intermediate member out of engagement with a particular one of said driven members and continuing said movement until said detent means mates with a particular one of said recesses, thus bringing said intermediate member into full engagement with the driven member corresponding to said particular recess.

6. In a multi-function control device, the combination of a sun gear; driving means for said sun gear; a planetary gear member continuously engaging said sun gear; a carrier for said planetary gear member mounted for coaxial rotation with respect to said sun gear; a mounting member; a plurality of function gears mounted on said mounting member for rotation independently of one another, said function gears being located relative to said sun gear such that each may be singly engaged by said planetary gear member; detent means mounted for rotation with said carriers; resilient means for biasing said detent means toward the disengaged position thereof; a stop member; a plurality of recesses in said stop member, each said recess being located to receive said detent means when said planetary gear member is in full engagement with a corresponding one of said function gears; and means for optionally overcoming the force of said resilient means, whereby when said last-named means is activated, said carrier is rotated, through the reaction of said planetary gear member against said sun gear, until said detent means mates with a particular one of said recesses, thus bringing said planetary gear member into full engagement with the function gear corresponding to said particular recess, and said corresponding function gear is thereafter driven by said sun gear through the medium of said planetary gear member.

7. In a multi-function control device, the combination of a driving member; an electric motor for driving said driving member; a source of power for said motor; an intermediate member continuously engaging said driving member; a movable carrier for said intermediate member; a plurality of driven members rotatable independently of one another, said driven members being located such that each may be singly engaged by said intermediate member; detent means mounted for movement with said carrier; a stop member for said detent means; a plurality of recesses in said stop member, each said recess being located to receive said detent means when said intermediate member is in full engagement with a corresponding one of said driven members; resilient means for biasing said detent means toward the disengaged position thereof; a control circuit for controlling the application of power from said source to said motor; and means controlled by said control circuit for overcoming the force of said resilient means, whereby said last-named means may be activated under the direction of said control circuit to cause the release of said detent means from a particular one of said recesses and to cause said carrier to move until said detent means is opposite one of said recesses; and thereafter, as directed by said control circuit, the driven member corresponding to said last-mentioned recess may be driven by said driving member through the medium of said intermediate member.

8. In a multi-function control device, the combination of a sun gear; an electric motor for driving said sun gear; a source of power for said motor; a planetary gear member continuously engaging said sun gear; a carrier for said planetary gear member, said carrier being mounted for coaxial rotation with respect to said sun gear; a mounting member; a plurality of function gears mounted on said mounting member for rotation independent of one another, said function gears being located relative to said sun gear such that each may be singly engaged by said planetary gear member; detent means mounted for rotation with said carrier; a stop member for said detent means; a plurality of recesses in said stop member, each said recess being located to receive said detent means when said planetary gear member is in full engagement with a corresponding one of said function gears; resilient means for biasing said detent means toward the disengaged position thereof; a control circuit for controlling the application of power from said source to said motor; and means controlled by said control circuit for overcoming the force of said resilient means, whereby said last-named means may be activated under the direction of said control circuit to cause the release of said detent means from a particular one of said recesses, thus causing said carrier to rotate, because of the reaction of said planetary gear member against said sun gear, until said detent means is opposite one of said recesses; and thereafter, as directed by said control circuit, the function gear corresponding to said last-mentioned recess may be driven by said sun gear through the medium of said planetary gear member.

9. In a multi-function control device, the combination of a driving member; an electric motor having a field structure and an armature axially displaceable from the magnetic center of said field structure, said armature being coupled for rotation to said driving member; a source of power for said motor; an intermediate member continuously engaging said driving member; a carrier for said intermediate member mounted for movement with respect to said driving member, said carrier further being mounted for axial movement with said armature; a plurality of driven members rotatable independently of one another; said driven members being located such that each may be singly engaged by said intermediate member; detent means mounted for movement with said carrier; a stop member for said detent means; a plurality of recesses in said stop member, each said recess being located to receive said detent means when said intermediate member is in full engagement with a corresponding one of said driven members; resilient means acting to displace said armature axially from the magnetic center of said field structure, thereby to move said detent means mounted on said carrier into a disengaged position relative to said recess; switch means operative only when said armature is displaced from said magnetic center of said field structure to complete a first circuit from said source of power to said motor; and means for making a second circuit from said source of power to said motor, whereby upon the activation of said source of power, said motor is energized through said first circuit, thereby to move said carrier until said detent means is opposite one of said recesses and mates therewith, whereupon said first circuit is broken but said motor is then energized through said second circuit.

10. In a multi-function control device, the combination of a sun gear; an electric motor having a field structure and an armature axially displaceable from the magnetic center of said field structure, said armature being coupled for rotation to said sun gear; a source of power for said motor; a planetary gear member continuously engaging said sun gear; a carrier for said planetary gear member mounted for rotation coaxially with respect to said sun gear, said carrier further being mounted for axial movement with said armature; a mounting member; a plurality of function gears mounted on said mounting member for rotation independent of one another, said function gears being located relative to said sun gear such that each may be singly engaged by said planetary gear member; detent means mounted for rotation with said carrier; a stop member for said detent means; a plurality of recesses in said stop member, each said recess being located to receive said detent means when said planetary gear member is in full engagement with a corresponding one of said function gears; resilient means acting to displace said armature axially from the magnetic center of said field structure, thereby to move said detent means mounted on said carrier into a disengaged position relative to said recesses; switch means operative only when said armature is displaced from said magnetic center of said field structure to complete a first circuit from said source of power to said motor; and means for making a second circuit from said source of power to said motor, whereby upon the activation of said source of power, said motor is energized through said first circuit, thereby to rotate said carrier, because of the reaction of said planetary gear member against said sun gear, until said detent means is opposite one of said recesses and mates therewith, whereupon said first circuit is broken but said motor is then energized through said second circuit.

11. In a multi-function control dvice, the combination of a driving member; an electric motor having a field structure and an armature axially displaceable from the magnetic center of said field structure, said armature being coupled for rotation to said driving member; a source of power for said motor; an intermediate member continuously engaging said driving member; a carrier for said intermediate member mounted for movement with respect to said driving member; said carrier further being mounted for axial movement with said armature; a plurality of driven members rotatable independently of one another; said driven members being located relative to said driving member such that each may be singly engaged by said intermediate member; detent means mounted for movement with said carrier; a stop member for said detent means; a plurality of recesses in said stop member, each said recess being located to receive said detent means when said intermediate member is in full engagement with a correseponding one of said driven members; resilient means acting to displace said armature axially from the magnetic center of said field structure, switch means operative only when said armature is displaced from said magnetic center of said field structure to complete a first circuit from said source of power to said motor, thereby to move said detent means mounted on said carrier into a disengaged position relative to said recesses; a plurality of sets of normally open contacts corresponding respectively to said plurality of driven members; an actuator mounted on said carrier for closing said contacts, one set at a time, as said carrier brings said intermediate member into full engagement with a corresponding one of said driven members; and means for completing a second circuit from said source of power to said motor through said contacts, whereby upon actuation of said source of power, said motor is energized through said first circuit, thereby to move said carrier until said detent means is opposite one of said recesses and mates therewith, whereupon said carrier is stopped from further movement and said first circuit to said motor is broken, but said motor is then energized through said second circuit, including a particular set of said contacts, to drive the corresponding one of said driven members through the medium of said driving member and said intermediate member.

12. In a multi-function control device, the combination of a sun gear; an electric motor having a field structure and an armature axially displaceable from the magnetic center of said field structure, said armature being coupled for rotation to said sun gear; a source of power for said motor; a planetary gear member continuously engaging said sun gear; a carrier for said planetary gear member mounted for rotation coaxially with respect to said sun gear; said carrier further being mounted for axial movement with said armature; a mounting member; a plurality of function gears mounted on said mounting member for rotation independent of one another; said function gears being located relative to said sun gear such that each may be singly engaged by said planetary gear member; detent means mounted for rotation with said carrier; a stop member for said detent means; a plurality of recesses in said stop member, each said recess being located to receive said detent means when said planetary gear member is in full engagement with a corresponding one of said function gears; resilient means acting to displace said armature axially from the magnetic center of said field structure, switch means operative only when said armature is displaced from said magnetic center of said field structure to complete a first circuit from said source of power to said motor, thereby to move said detent means mounted on said carrier into a disengaged position relative to said recesses; a plurality of sets of normally open contacts corresponding respectively to said plurality of function gears; an actuator mounted on said carrier for closing said contacts, one set at a time, as said carrier brings said planetary gear member into full engagement with a corresponding one of said function gears; and means for completing a second circuit from said source of power to said motor through said contacts, whereby upon actuation of said source of power, said motor is energized through said first circuit, thereby to rotate said carrier, because of the reaction of said planetary gear member against sun gear, until said detent means is opposite one of said recesses and mates therewith, whereupon said carrier is stopped from further rotation and said first circuit to said motor is broken, but said motor is then energized through said second circuit, including a particular set of said contacts, to drive the corresponding one of said function gears through the medium of said sun gear and said planetary gear member.

13. In a multi-function control device, the combination of a driving member; an electric motor having a field structure and an armature axially displaceable from the magnetic center of said field structure, said armature being coupled for rotation to said driving member; a source of power for said motor; an intermediate member continuously engaging said driving member; a carrier for said intermediate member mounted for movement with respect to said driving member; said carrier further being mounted for axial movement with said armature; a plurality of driven members rotatable independently of one another; said driven members being located such that each may be singly engaged by said intermediate member; detent means mounted for movement with said carrier; a stop member for said detent means; a plurality of recesses in said stop member, each said recess being located to receive said detent means when said intermediate member is in full engagement with a corresponding one of said driven members; resilient means acting to displace said armature axially from the magnetic center of said field structure, switch means operative only when said armature is displaced from said magnetic center of said field structure to complete a first circuit from said source of power to said motor, thereby to move said detent means mounted on said carrier into a disengaged position relative to said recesses; a plurality of sets of normally open contacts corresponding respectively to said plurality of driven members; an actuator mounted on said carrier for closing said contacts, one set at a time, as said carrier brings said intermediate member into full engagement with a corresponding one of said driven members; and a function-selecting switch operative to complete a second circuit including any one of said sets of contacts between said source of power and said motor, whereby upon actuation of said source of power, said motor is energized through said first circuit, thereby to move said carrier until said detent means is opposite one of said recesses and mates therewith, whereupon said carrier is stopped from further movement and said first circuit to said motor is broken, but said motor is then energized through said second circuit, including the particular set of said contacts selected by said function-selecting switch, to drive the particular one of said driven members corresponding to said particular set of contacts.

14. In a multi-function control device, the combination of a sun gear; an electric motor having a field structure and an armature axially displaceable from the magnetic center of said field structure, said armature being coupled for rotation to said sun gear; a source of power for said motor; a planetary gear member continuously engaging said sun gear; a carrier for said planetary gear member mounted for rotation coaxially with respect to said sun gear; said carrier further being mounted for axial movement with said armature; a mounting member; a plurality of function gears mounted on said mounting member for rotation independent of one another; said function gears being located relative to said sun gear such that each may be singly engaged by said planetary gear member; detent means mounted for rotation with said carrier; a stop member for said detent means; a plurality of recesses in said stop member, each said recess being located to receive said detent means when said planetary gear member is in full engagement with a corresponding one of said function gears; resilient means acting to displace said armature axially from the magnetic center of said field structure, switch means operative only when said armature is displaced from said magnetic center of said field structure to complete a first circuit from said source of power to said motor, thereby to move said detent means mounted on said carrier into a disengaged position relative to said recesses; a plurality of sets of normally open contacts corresponding respectively to said plurality of function gears; an actuator mounted on said carrier for closing said contacts, one set at a time, as said carrier brings said planetary gear member into full engagement with a corresponding one of said function gears; and a function-selecting switch operative to complete a second circuit including any one of said sets of contacts between said source of power and said motor, whereby upon actuation of said source of power, said motor is energized through said first circuit, thereby to rotate said carrier, because of the reaction of said planetary gear member against sun gear, until said detent means is opposite one of said recesses and mates therewith, whereupon said carrier is stopped from further rotation and said first circuit to said motor is broken, but said motor is then energized through said second circuit, including the particular set of said contacts selected by said function-selecting switch, to drive, through the medium of said sun gear and said planetary gear member, the particular one of said function gears corresponding to said particular set of contacts.

15. In a multi-function control device, the combination of a driving member; an electric motor having a field structure and an armature axially displaceable from the magnetic center of said field structure, said armature being coupled for rotation to said driving member; a source of power for said motor; an intermediate member continuously engaging said driving member; a carrier for said intermediate member mounted for movement with respect to said driving member; said carrier further being mounted for axial movement with said armature; a plurality of driven members rotatable independently of one another; said driven members being located such that each may be singly engaged by said intermediate member; detent means mounted for movement with said carrier; a stop member for said detent means; a plurality of recesses in said stop member, each said recess being located to receive said detent means when said intermediate member is in full engagement with a corresponding one of said driven members; resilient means acting to displace said armature axially from the magnetic center of said field structure, switch means operative only when said armature is displaced from said magnetic center of said field structure to complete a first circuit from said source of power to said motor, thereby to move said detent means mounted on said carrier into a disengaged position relative to said recesses; a plurality of sets of normally open contacts corresponding respectively to said plurality of driven members; an actuator mounted on said carrier for closing said contacts, one set at a time, as said carrier brings said intermediate member into full engagement with a corresponding one of said driven members; and a remote-control head having a function-selecting switch operative to complete a second circuit including any one of said sets of contacts between said source of power and said motor, and a motor-direction control switch having forward, reverse and off positions, said head being connected to said motor by a flexible multi-conductor cable, whereby upon actuation of said source of power, said motor is energized through said first circuit, thereby to move said carrier until said detent means is opposite one of said recesses and mates therewith, whereupon said carrier is stopped from further movement and said first circuit to said motor is broken, but said motor is then energized through said second circuit, including the particular set of said contacts selected by said function-selecting switch, to drive, through the medium of said driving member and said intermediate member, the particular one of said driven members corresponding to said particular set of contacts.

16. In a multi-function control device, the combination of a sun gear; an electric motor having a field structure and an armature axially displaceable from the magnetic center of said field structure, said armature being coupled for rotation to said sun gear; a source of power for said motor; a planetary gear member continuously engaging said sun gear; a carrier for said planetary gear member mounted for rotation coaxially with respect to said sun gear; said carrier further being mounted for axial movement with said armature; a mounting member; a plurality of function gears mounted on said mounting member for rotation independent of one another; said function gears being located relative to said sun gear such that each may be singly engaged by said planetary gear member; detent means mounted for rotation with said carrier; a stop member for said detent means; a plurality of recesses in said stop member, each said recess being located to receive said detent means when said planetary gear member is in full engagement with a corresponding one of said function gears; resilient means acting to displace said armature axially from the magnetic center of said field structure, switch means operative only when said armature is displaced from said magnetic center of said field structure to complete a first circuit from said source of power to said motor, thereby to move said detent means mounted on said carrier into a disengaged position relative to said recesses, a plurality of sets of normally open contacts corresponding respectively to said plurality of function gears; an actuator mounted on said carrier for closing said contacts, one set at a time, as said carrier brings said planetary gear member into full engagement with a corresponding one of said function gears; and a remote-control head having a function-selecting switch operative to complete a second circuit including any one of said sets of contacts between said source of power and said motor, and a motor-direction control switch having forward, reverse, and stop positions, said head being connected to said motor by flexible multi-conductor cable, whereby upon actuation of said source of power, said motor is energized through said first circuit, thereby to rotate said carrier, because of the reaction of said planetary gear member against sun gear, until said detent means is opposite one of said recesses and mates therewith, whereupon said carrier is stopped from further rotation and said first circuit to said motor is broken, but said motor is then energized through said second circuit, including the particular set of said contacts selected by said function-selecting switch, to drive, through the medium of said sun gear and said planetary gear member, the particular one of said function gears corresponding to said particular set of contacts.

17. In a multi-function control device, the combination of a sun gear; an electric motor having a field structure and an armature axially displaceable from the magnetic center of said field structure, said armature being coupled for rotation to said sun gear; a source of power for said motor; a planetary gear member continuously engaging said sun gear; a carrier for said planetary gear member mounted for rotation coaxially with respect to said sun gear; said carrier further being mounted for axial movement with said armature; a mounting member; a plurality of function gears mounted on said mounting member for rotation independent of one another; said function gears being located relative to said sun gear such that each may be singly engaged by said planetary gear member; detent means mounted for rotation with said carrier; a stop member for said detent means; a plurality of recesses in said stop member, each said recess being located to receive said detent means when said planetary gear member is in full engagement with a corresponding one of said function gears; resilient means acting to displace said armature axially from the magnetic center of said field structure, switch means operative only when said armature is displaced from said magnetic center of said field structure to complete a first circuit from said source of power to said motor, thereby to move said detent means mounted on said carrier into a disengaged position relative to said recesses; a plurality of sets of normally open contacts corresponding respectively to said plurality of function gears; an actuator mounted on said carrier for closing said contacts, one set at a time, as said carrier brings said planetary gear member into full engagement with a corresponding one of said function gears; and a cabinet for housing the foregoing items; a remote-control head having a function-selecting switch operative to complete a second circuit including any one of said sets of contacts between said source of power and said motor, and a motor-direction control switch having forward, reverse, and stop positions, said head being connected to said motor by flexible multi-conductor cable, and means for reeling any unneeded portion of said cable into said cabinet; whereby upon actuation of said source of power, said motor is energized through said first circuit, thereby to rotate said carrier, because of the reaction of said planetary gear member against sun gear, until said detent means is opposite one of said recesses and mates therewith, whereupon said carrier is stopped from further rotation and said first circuit to said motor is broken, but said motor is then energized through said second circuit, including the particular set of said contacts selected by said function-selecting switch to drive, through the medium of said sun gear and said planetary gear member, the particular one of said function gears corresponding to said particular set of contacts.

18. In a multi-function control device, the combination of an electric motor having a field structure and an armature axially displaceable from the magnetic center of said field structure; a source of power for said motor; a position member having an axis of rotation, said position member being coupled for rotation about said axis to said armature; detent means mounted for rotation with said carrier; a stop member for said detent means; a plurality of recesses in said stop member representing, and corresponding to, various angular positions of said position member, each said recess being adapted to mate with said detent means; resilient means acting to displace said armature axially from the magnetic center of said field structure, thereby to move said detent means mounted on said position member into a disengaged position relative to said recesses; switch means operative only when said armature is displaced from said magnetic-center of said field structure to complete a first circuit from said source of power to said motor; a plurality of sets of normally-open contacts, each of said sets corresponding to a particular one of said recesses; an actuator carried by said position member; each said set of contacts being positioned to be closed by said actuator when said detent means is mated with a corresponding one of said recesses; and means for completing a second circuit between said source of power and said motor through one of said sets of contacts, whereby upon actuation of said source of power, said motor is energized through said first circuit to rotate said position member, said detent means abutting against said stop member until said detent means can drop into one of said recesses, thus allowing said armature to be pulled toward the magnetic center line of said field structure and said switch means to break said first circuit, this procedure thereupon repeating until said detent means mates with a particular one of said recesses corresponding to a particular set of said contacts through which said last-named means has closed said second circuit.

19. In a multi-function control device, the combination of an electric motor having a field structure and an armature axially displaceable from the magnetic center of said field structure; a source of power for said motor; a position member having an axis of rotation, said position member being coupled for rotation about said axis to said armature; detent means mounted for rotation with said carrier; a stop member for said detent means; a plurality of recesses in said stop member representing, and corresponding to, various angular positions of said position member, each said recess being adapted to mate with said detent means; resilient means acting to displace said armature axially from the magnetic center of said field structure, thereby to move said detent means mounted on said position member into a disengaged position relative to said recesses; switch means operative only when said armature is displaced from said magnetic center of said field structure to complete a first circuit from said source of power to said motor; a plurality of sets of normally-open contacts, each said set corresponding to a particular one of said recesses; an actuator carried by said position member; each said set of contacts being positioned to be closed by said actuator when said detent means is mated with a corresponding one of said recesses; and a remote-control head including a function-selecting switch for completing a second circuit between said source of power and said motor through only one of said sets of contacts at a time, said head being connected to said motor by flexible multi-conductor cable, whereby upon actuation of said source of power, said motor is energized through said first circuit to rotate said position member, said detent means butting against said stop member until said detent means can drop into one of said recesses, thus allowing said armature to be pulled toward the magnetic center of said field structure and said resilient means to break said first circuit, this procedure thereupon repeating until said detent means mates with a particular one of said recesses corresponding to a particular set of said contacts through which said function-selecting switch has closed said second circuit.

HOWARD S. GLEASON.

REFERENCES CITED

The following references are of record in the file of this patent:

UNITED STATES PATENTS

| Number | Name | Date |
| --- | --- | --- |
| 759,111 | Johnson | May 3, 1904 |
| 2,002,443 | Thomas | May 21, 1935 |
| 2,046,910 | Barrett | July 7, 1936 |
| 2,094,669 | Pratt | Oct. 5, 1937 |